United States Patent Office 3,502,606
Patented Mar. 24, 1970

3,502,606
PRODUCTION OF SHAPED POLYBENZIMIDAZOLE ARTICLES
Anthony B. Conciatori, Chatham and Charles L. Smart, Millington, N.J., assignors to Celanese Corporation, New York, N.Y., a corporation of Delaware
No Drawing. Filed Jan. 19, 1966, Ser. No. 521,501
Int. Cl. C08g 53/14, 33/02
U.S. Cl. 260—32.6
8 Claims

ABSTRACT OF THE DISCLOSURE

An improved process is provided for the formation of shaped polybenzimidazole articles in which the polymer solution which is extruded contains an additive having the ability to prevent its separation into various phases containing greater and lesser concentrations of the polymer prior to its extrusion. A minor amount of the following additives are utilized to prevent phase separation in the present process: lithium chloride, zinc chloride, N-methyl morpholine, triethyl amine, or triethanol amine.

---

This invention relates to the preparation of crystalline, oriented polybenzimidazole fibers.

Polybenzimidazoles are a known class of heterocyclic polymers. Their preparation and description are disclosed, for example, in Patents Nos. 2,895,948 and 3,174,947. A particularly interesting subclass of polybenzimidazoles for fiber production consists of recurring units of the formula:

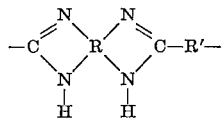

wherein R is a symetrically tetravalent aromatic nucleus, the adjacent carbon atoms of which pair with nitrogen atoms from a corresponding tetra-nitrogen monomer, e.g., tetra-amine, to form the benzimidazole rings, and R' is a carbocyclic, aromatic or alicyclic ring, an alkylene group or a heterocyclic ring. Examples of such heterocyclic rings include those of pyridine, pyrazine, furan, quinoline, thiophene and pyran. Preferred R groups are diphenyl with free valences at the 3,3',4, and 4' positions, i.e.

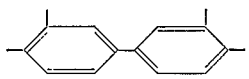

benzene with free valences at the 1,2,4 and 5 positions, i.e.

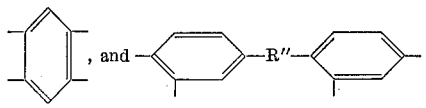

wherein R'' is

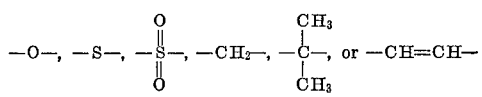

Examples of such polybenzimidazoles include poly-2,2'(m-phenylene)5,5'-bibenzimidazole;
poly-2,2'-(pyridylene-3'',5'')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(biphenylene 4'', 4''')-5,5'-bibenzimidazole;
poly-2,2'-amylene-5,5'-bibenzimidazole,
poly-2,2'-octamethylene-5,5'-bibenzimidazole,
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2''(m-phenylene)-5',5''di(benzimidazole)
propane-2,2 and
poly-2',2''(m-phenylene)-5',5''di(benzimidazole)
ethylene-1,2 where the double bonds of the ethylene groups are intact in the final polymer.

Polybenzimidazoles are characterized by a high degree of thermal stability. They may be shaped to form fibers, films and other shaped articles of wide utility which show great resistance to degradation by heat, hydrolytic media and oxidizing media.

As set forth in U.S. Patent No. 3,174,947, the preferred high molecular weight polybenzimidazoles are prepared by reacting a member of the class consisting of (A) an aromatic compound containing ortho disposed diamino substituents and an aromatic carboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic acid and, (b) the diphenyl ester of a heterocyclic dicarboxylic acid wherein the carboxyl groups are substituents upon carbon in a ring compound from the class consisting of pyridine, pyrazine, furan and quinoline and (c) an anhydride of an aromatic dicarboxylic acid. It should be noted that the "aromatic compound" mentioned in the foregoing descriptions of (A) and (B) may contain a single aromatic ring structure or a plurality of such ring structures, e.g. two such structures separated by an ether, sulfide, sulfone, alkylidene or alkylene group to yield the foregoing polymer structures.

As described in U.S. Patent No. 3,174,947 and in Vogel et al., J. Polymer Science, volume 50, pp. 511–539 (1961), the foregoing polybenzimidazoles may be prepared by means of a two stage process. The monomers are charged to a reactor and heated from 200 to 300° C. under a pressure of less than 0.5 mm. Hg. The foaming melt polymerized product is then cooled, finely powdered and recharged to a reactor, followed by heating at a temperature of at least 250° C. and a pressure of less than 0.7 mm. whereby the final solid state condensation occurs. This process may be modified by replacing the vacuum conditions by a flow of substantially oxygen-free nitrogen through the reactor at atmospheric pressure.

The foregoing polybenzimidazoles are generally formed into filaments and films by dry or wet extruding a solution of the polymer in an appropriate solvent such as dimethyl acetamide, dimethyl formamide or dimethyl sulfoxide through an opening of predetermined shape into an evaporative atmosphere for the solvent in which most of it is evaporated, or into a coagulation bath, resulting in the polymer having the desired shape. In the case of filaments, this is called "dry spinning" or "wet spinning" respectively.

In a commercial dry or wet extrusion process, the polymer solution is often prepared some time prior to actual extrusion to insure an adequate supply of polymer solution for the purpose of keeping the extrusion equipment operating at full capacity. Under these circumstances, the polymer solution is often prepared at least one to three days prior to extrusion. Moreover the polymer solution occasionally must be stored for periods of up to 20 days or longer depending on the operation of the extrusion equipment. Thus, these relatively long storage periods may be necessary when extrusion units, e.g. spinning metiers, are shut down for purposes of cleaning or repair.

It has been found that solutions of the foregoing polybenzimidazoles in an organic solvent suitable for extrusion into shaped articles often cannot be stored for more than one to three days without a "phasing out" phenomenon occurring, i.e., a separation of the solution into two phases containing larger and smaller concentrations of polymer. This phased out solution is completely unsuitable for extrusion into shaped articles and thus interferes with routine storage of the polymer solution in an extrusion plant. While the phased out solution can generally be transformed into a homogeneous solution by means of additional mixing procedures, the latter result in additional expense and inconvenience.

In accordance with this invention, the phasing out after one to three days of a polybenzimidazole solution suitable for extrusion, is prevented by adding a minor amount of at least one of the following additives to the polymer solution: lithium chloride, zinc chloride, N-methyl morpholine, triethyl amine or triethanol amine. The preferred additive is lithium chloride.

The addivtive may be present for example in an amount of 0.5 to 10%, preferably 1.5 to 5%, based on the weight of solution of additive in solvent (before the addition of polymer). Preferably, the additive is added to the solvent first and the polymer is then dissolved in the solution to yield a final solution suitable for extrusion containing 20 to 40%, preferably 25 to 35%, of polymer based on the total weight of solution including additive.

The polymer solution may be prepared, for example, by agitating the polymer and additive solution at a temperature of 25 to 120° C. above the atmospheric boiling point of the solvent, preferably 50 to 80° C. above such boiling point, at a pressure of 2 to 15 atmospheres for a period of 1 to 5 hours.

The additive-containing solution is stable, e.g. at a temperature of from 25° C. to 100° C. for a period of at least one to three days and generally for 20 days or more. After being stored for any of these periods, it may be extruded into an evaporative atmosphere for the solvent or into a coagulation bath, e.g. dry or wet spun in the case of filaments, to form a shaped article.

The following examples further illustrate the invention.

EXAMPLE I

Stoichiometric quantities of pure 3,3'-diaminobenzidine and diphenylisophthalate are charged to a fifteen gallon hot oil jacketed agitated stainless steel and freed of all air by purging several times with deoxygenated nitrogen followed by a constant flow of about 2 standard cubic feet per hour of nitrogen through the reactor in which a pressure of about one atmosphere is maintained. The oil is preheated to 150° C. and heated to 290° C. in 40–50 minutes. At about 260° C., phenol and water are evolved. When the mass becomes exceedingly viscous, agitation is stopped and heating at 290° C. is continued for 90 minutes to conclude the first stage of the reaction.

The polymer from the first stage which is in the form of a voluminous foam and has an inherent viscosity of about 0.24 is pulverized and charged to a second, one gallon electrically heated agitated reactor. The vapor space of this reactor is likewise purged several times with deoxygenated nitrogen and a constant flow of about 1.0 standard cubic feet of such nitrogen is maintained through the reactor during the entire second stage of the reaction, which is also carried out at about one atmosphere of pressure. The batch is gradually heated to 385° C. and kept at that temperature for three hours to conclude the second stage of the reaction.

The final poly 2,2'(m-phenylene)5,5'-bibenzimidazole is found to have an inhrent viscosity of 0.89 and a plugging value of 0.35.

A 1% solution of lithium chloride in dimethyl acetamide as solvent based on the weight of solution was prepared by agitating the lithium chloride with the solvent. 30 parts by weight of the foregoing polymer was agitated with 70 parts by weight of the lithium chloride solution for 15 minutes at 140° C. and set aside at room temperature. After 30 days the solution was found to still be homogeneous and suitable for extrusion into shaped articles.

After filtration and 3 days of storage time, the polymer solution is extruded through a spinneret 1½ inches thick containing 50 holes of 76 microns diameter into a downdraft spinning column containing circulating nitrogen to produce a yarn of 400 total denier, the spinneret face being at a temperature of 130–160° C., the top of the column 120–150° C., the middle of the column 160–200° and the bottom of the column 200–250° C. After leaving the spinning column, the yarn is taken up at a speed of 100 meters per minute. The yarn is drawn in steam at atmospheric pressure at a draw ratio of 1.1 to 1, washed with water on perforated bobbins and dried after which it has a tenacity of about 1.5 grams per denier and an elongation of about 100%. Further drawing in a tube furnace with multiple passes for increased retention at 520° C. using a draw ratio of 2.1 to 1 results in a yarn having a tenacity of about 5 grams per denier and an elongation of about 23%.

EXAMPLE II

The procedure of Example I is repeated except that 5% of lithium chloride is used based on the weight of additive solution before the polymer is added. Similar results are obtained.

EXAMPLE III

The procedure of Example I is repeated except that 2.5% of zinc chloride is used. Similar results are obtained.

EXAMPLE IV

The procedure of Example I is repeated except that 5% of N-methyl morpholine was used as the additive. The resulting polymer solutions are stable after 20 days storage. Spinning of the solution as described in Example I yields similar results.

EXAMPLE V

The procedure of Example I is repeated except that the additive is 5% of triethylamine. The polymer solution is stable after storing for 20 days at 100° C. and could be spun into filaments as described in Example I.

EXAMPLE VI

The procedure of Example I is repeated except that the additive is 5% of triethanol amine. The polymer solution is stable after storing for 20 days at 100° C. and could be spun into filaments as described in Example I.

When the procedure of Examples I to VI is attempted to be repeated except that no additive is employed, the polymer separates into two phases after 3 days of storage and cannot be dry spun into useful filaments after such storage period.

In addition to demethyl acetamide, the polybenzimidazole and additive contemplated by this invention may be dissolved in other appropriate solvents such as dimethyl formamide or dimethyl sulfoxide to form a solution suitable for extrusion into shaped articles such as filaments. After suitable after-treatments such as drawing and heating, the filaments may be knitted or woven into fabrics having excellent high temperature properties. Such fabrics are thus useful in applications such as space suits, parachutes, etc.

Many variants of the process will be apparent to one skilled in the art within the spirit of the present invention.

The embodiments of the invention in which an exclusive property or privilege is claimed are defined as follows:

1. A process for forming shaped polybenzimidazole articles comprising dissolving a polybenzimidazole and a minor amount of an additive selected from the group consisting of lithium chloride, zinc chloride, N-methyl morpholine, triethyl amine and triethanol amine in an organic solvent capable of dissolving said polybenzimidazole, storing the resulting solution for a period of at least one day without the occurrence of substantial phase separation in the same, and extruding the solution through an opening to form a shaped article.

2. The process of claim 1 wherein said additive is lithium chloride.

3. The process of claim 1 wherein said polymer is poly-2,2'-m-phenylene-5,5'-bibenzimadazole.

4. The process of claim 1 wherein said additive is employed in an amount of 0.5 to 10% based on the weight of additive plus solvent.

5. The process of claim 1 wherein said solvent is dimethyl acetamide.

6. The process of claim 1 wherein said shaped article is a filament.

7. The process of claim 1 wherein said solution is stored for at least 3 days prior to extrusion.

8. The process of claim 1 wherein said solution is extruded into an evaporative atmosphere for the solvent to form said shaped article.

References Cited

UNITED STATES PATENTS

| | | | |
|---|---|---|---|
| 2,895,948 | 7/1959 | Brinker | 260—78.4 |
| 3,174,947 | 3/1965 | Marvel. | |
| 3,068,188 | 12/1962 | Beste. | |
| 3,324,086 | 6/1967 | Preston. | |
| 3,154,610 | 10/1964 | Denyes | 264—169 |

OTHER REFERENCES

"Fibres from Synthetic Polymers," Hill, Elsevier Pub. Co. pp. 396, 395, 398.

ALLEN LIEBERMAN, Primary Examiner

P. R. MICHL, Assistant Examiner

U.S. Cl. X.R.

260—29.1, 30.4, 30.8